(12) United States Patent
Chou

(10) Patent No.: US 9,948,345 B2
(45) Date of Patent: Apr. 17, 2018

(54) PROTECTIVE CASE

(71) Applicant: X-FACTOR TAIWAN CORPORATION, Taipei (TW)

(72) Inventor: Chin-Hung Chou, Taipei (TW)

(73) Assignee: X-FACTOR TAIWAN CORPORATION, Taipei (TW)

( * ) Notice: Subject to any disclaimer, the term of this patent is extended or adjusted under 35 U.S.C. 154(b) by 0 days.

(21) Appl. No.: 15/446,272

(22) Filed: Mar. 1, 2017

(65) Prior Publication Data

US 2017/0353207 A1    Dec. 7, 2017

(30) Foreign Application Priority Data

Jun. 4, 2016 (TW) .............................. 105208429 A

(51) Int. Cl.
*H04M 1/02* (2006.01)
*H04B 1/3888* (2015.01)

(52) U.S. Cl.
CPC ........ *H04B 1/3888* (2013.01); *H04M 1/0202* (2013.01)

(58) Field of Classification Search
USPC ....................................................... 455/575.8
See application file for complete search history.

(56) References Cited

U.S. PATENT DOCUMENTS

| | | | | |
|---|---|---|---|---|
| D646,264 S | * | 10/2011 | Dong | ........................... D14/250 |
| 2010/0240427 A1 | * | 9/2010 | Lee | ...................... H04B 1/3888 |
| | | | | 455/575.8 |
| 2011/0287808 A1 | * | 11/2011 | Huang | .................. H04B 1/3883 |
| | | | | 455/557 |
| 2013/0127309 A1 | * | 5/2013 | Wyner | .................. H05K 5/0217 |
| | | | | 312/223.1 |
| 2013/0334069 A1 | * | 12/2013 | Fathollahi | ............ A45C 13/002 |
| | | | | 206/37 |
| 2016/0028428 A1 | * | 1/2016 | Sturniolo | ............. H04B 1/3888 |
| | | | | 455/575.8 |
| 2016/0043764 A1 | * | 2/2016 | Huang | .................. H01M 10/46 |
| | | | | 455/575.8 |
| 2016/0056855 A1 | * | 2/2016 | Berger | ................. H04B 1/3888 |
| | | | | 455/575.8 |
| 2016/0080022 A1 | * | 3/2016 | Radmard | .............. H04M 1/185 |
| | | | | 455/575.8 |
| 2016/0211877 A1 | * | 7/2016 | Poon | ..................... H04B 1/3888 |

\* cited by examiner

*Primary Examiner* — Nay A Maung
*Assistant Examiner* — Erica Fleming-Hall
(74) *Attorney, Agent, or Firm* — Tracy M. Heims; Apex Juris, pllc.

(57) ABSTRACT

A protective case includes a first half frame, which has a first body portion and a first strengthened portion connected to two different positions on the first body portion, and a second half frame, which has a second body portion and a second strengthened portion connected to two different positions on the second body portion. Two first abutting portions are provided at two different positions on the first body portion, and the first strengthened portion has a second abutting portion. Two third abutting portions adapted to abut against the first abutting portions are respectively provided at two different positions on the second body portion. The second strengthened portion has a fourth abutting portion adapted to abut against the second abutting portion. Whereby, the first body portion and the second body portion form a complete frame, which surrounds an outer periphery of an electronic device to provide a protective effect.

8 Claims, 6 Drawing Sheets

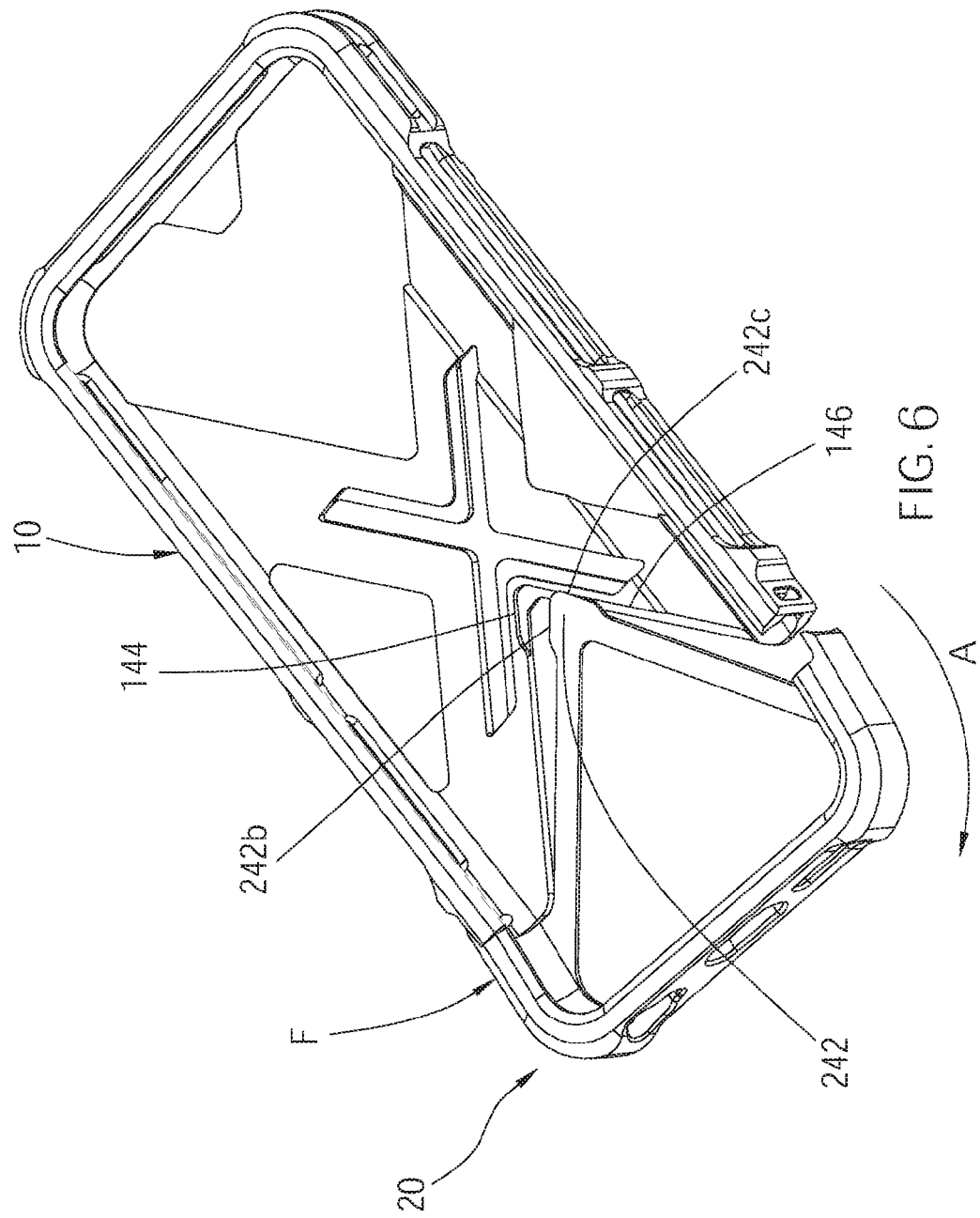

PROTECTIVE CASE

BACKGROUND OF THE INVENTION

1. Technical Field

The present invention relates to an accessory for an electronic device, and more particularly to a protective case for protecting the electronic device.

2. Description of Related Art

With advances in technology, electronic devices and mobile apparatuses have gradually reshaped the lifestyle of human, and some types of portable electronic devices such as tablet computers and smartphones are everywhere now. It is common to see people sliding their portable devices while walking, taking public transportation, dining, and in all kinds of circumstances. Some people may even become addicted to their phones.

Since electronic devices are high-priced products, most of the users would buy accessories with protective effect for their electronic devices. More particularly, protective cases which could protect electronic devices from scratches and damages are among the most popular accessories.

Typically, a conventional protective case is composed of a plurality of components, which are assembled with a peripheral edge of the electronic device through connecting members such as screws. However, the connecting members are usually rather small, and therefore are easily lost during the process of assembling. In addition, some hand tools (e.g., screwdrivers) are required to assemble such a casing, which is inconvenient for common users. Furthermore, after being assembled many times, the screws and the corresponding threaded holes may have collapsed threads, causing the protective case unable to be securely fixed.

BRIEF SUMMARY OF THE INVENTION

In view of the above, the primary objective of the present invention is to provide a protective case, which could be easily assembled, and protective case would have the advantage of being resistant to impact and not easily being disassembled.

To achieve the objective of the present invention, the present invention provides a protective case, which is adapted to be provided on an electronic device to reduce scratches and damages caused by impacts, wherein at least one part of the protective case surrounds an outer periphery of the electronic device. The protective case includes a first half frame and a second half frame, wherein the first half frame has a first body portion and a first strengthened portion. The first strengthened portion are connected to two different positions on the first body portion. Two first abutting portions are provided at two different positions on the first body portion. The first strengthened portion has a second abutting portion. The second half frame has a second body portion and a second strengthened portion, wherein the second strengthened portion are connected to two different positions on the second body portion. The second half frame is adapted to be engaged with the first half frame, whereby to form a complete frame, which surrounds the outer periphery of the electronic device when the protective case is provided on the electronic device. Two third abutting portions are provided at two different positions on the second body portion, wherein the third abutting portions abut against the first abutting portions when the first half frame is engaged with the second half frame, and when the second half frame is pushed by a force in a first direction, which prevents the second half frame from being disengaged from the first half frame. The second strengthened portion has a fourth abutting portion, wherein the fourth abutting portion abuts against the second abutting portion when the second half frame is pushed by another force in a second direction, whereby to prevent the second half frame from being disengaged from the first half frame.

With the aforementioned design, the protective case could effectively protect the electronic device from scratches and damages, and would not be easily disassembled by external forces.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 6 is a schematic diagram, showing the first half frame is detached from the second half frame.

DETAILED DESCRIPTION OF THE INVENTION

Figure 1:
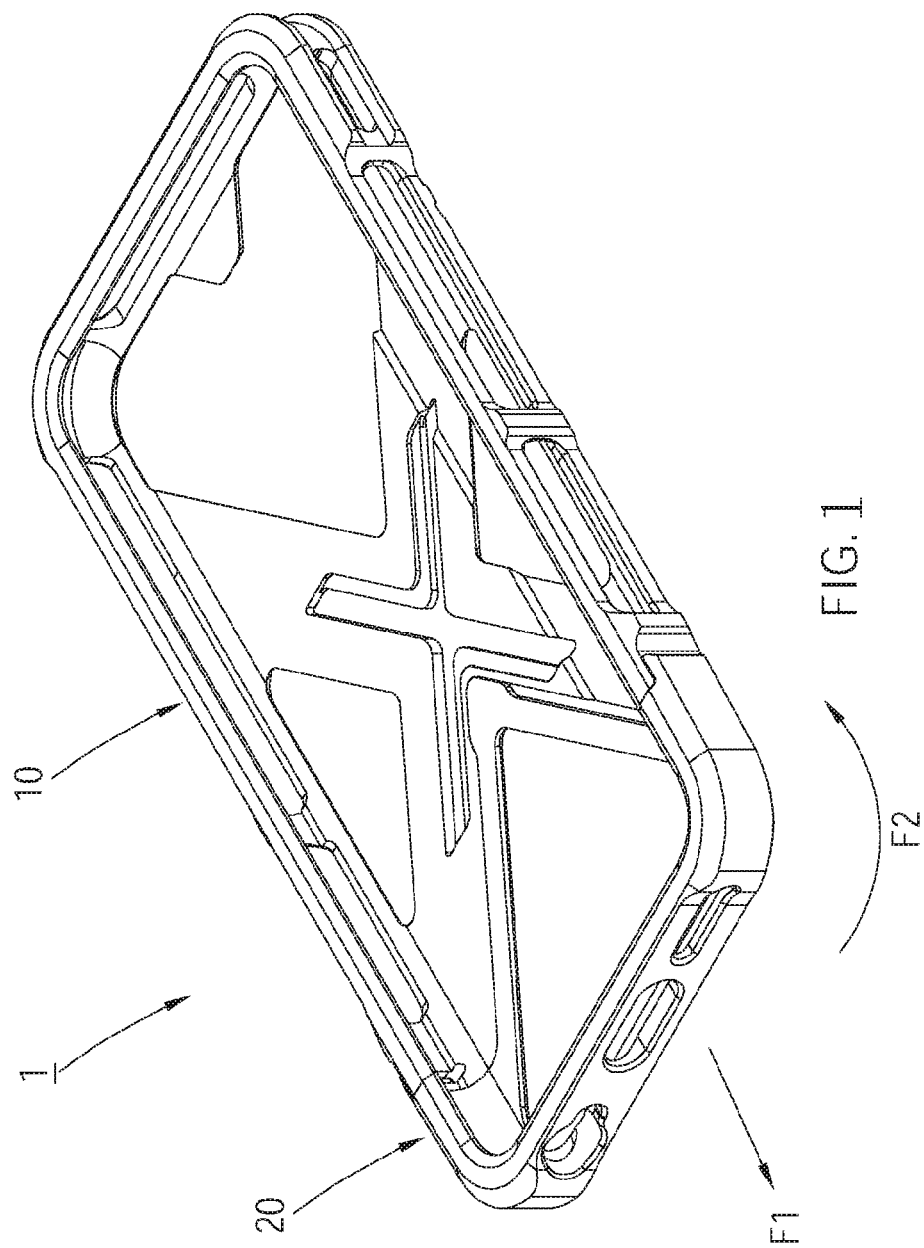
FIG. 1 is a perspective view of an embodiment of the present invention.

A protective case 1 of an embodiment of the present invention is illustrated in FIG. 1 to FIG. 4, which includes a first half frame 10 and a second half frame 20.

The first half frame 10 includes a first body portion 12 and a first strengthened portion 14.

Two first abutting portions are respectively provided at two different positions on the first body portion 12. In the embodiment, two first open ends are respectively provided at two different positions on the first body portion 12, wherein a perforation 122 is provided at each of the first open ends 120, wherein a wall of each of the perforations 122 is one of the aforementioned first abutting portions. An inner edge of the first body portion 12 is recessed to form a first slot 124, which is adapted to guide an electronic device (not shown) after a side of the electronic device enters the first open ends 120, whereby to eventually fix the electronic device by engaging a part of a periphery of the electronic device within the first slot 124. In addition, since most electronic devices may have function keys such as power key or volume keys provided on a periphery thereof, a plurality of hollow portions 126 could be further provided on a bottom of the first slot 124 to meet different requirements, wherein the hollow portions 126 go through an inner side and an outer side of the first body portion 12. Whereby, after the electronic device is engaged with the first slot 124, each of the function keys thereof could be exposed out through the corresponding hollow portion 126 to be easily pressed.

The first strengthened portion 14 is connected to two different positions on the first body portion 12. For instance, each of two lateral sides of the first strengthened portion 14 is connected to an inner edge on two lateral sides of the first body portion 12. In the embodiment, the first strengthened portion 14 and the first body portion 12 are integrally made. However, the way of making the first strengthened portion 14 and the first body portion 12 is not a limitation of the present invention. The first strengthened portion 14 has a second abutting portion. In the embodiment, the first strengthened portion 14 has a notch 15 recessed into an edge thereof, and the first strengthened portion 14 includes a first step surface 142, a first vertical surface 144, and a third vertical surface 146, wherein the first step surface 142 is recessed into a top surface 14a of the first strengthened portion 14. The first vertical surface 144 connects an edge of the first step surface 142 and the top surface 14a, while the third vertical surface 146 connects another edge of the first step surface 142 and the top surface 14a, wherein the first vertical surface 144 and the third vertical surface 146 are connected to each other with a bend at a junction therebetween. The first vertical surface 144 has the aforementioned second abutting portion. In the embodiment, the first vertical surface 144 includes a first segment 144a and a second segment 144b, wherein the first segment 144a and the second segment 144b are connected to each other with a bend at a junction therebetween, wherein the second segment 144b is the aforementioned second abutting portion. In practice, a plurality of hollow portions could be provided on the first strengthened portion 14, which would facilitate heat dissipation for the electronic device. In addition, since the first strengthened portion 14 and the first body portion 12 are integrally made, the structural strength of the first half frame would be sufficient to prevent itself from being deformed or twisted.

Figure 2:
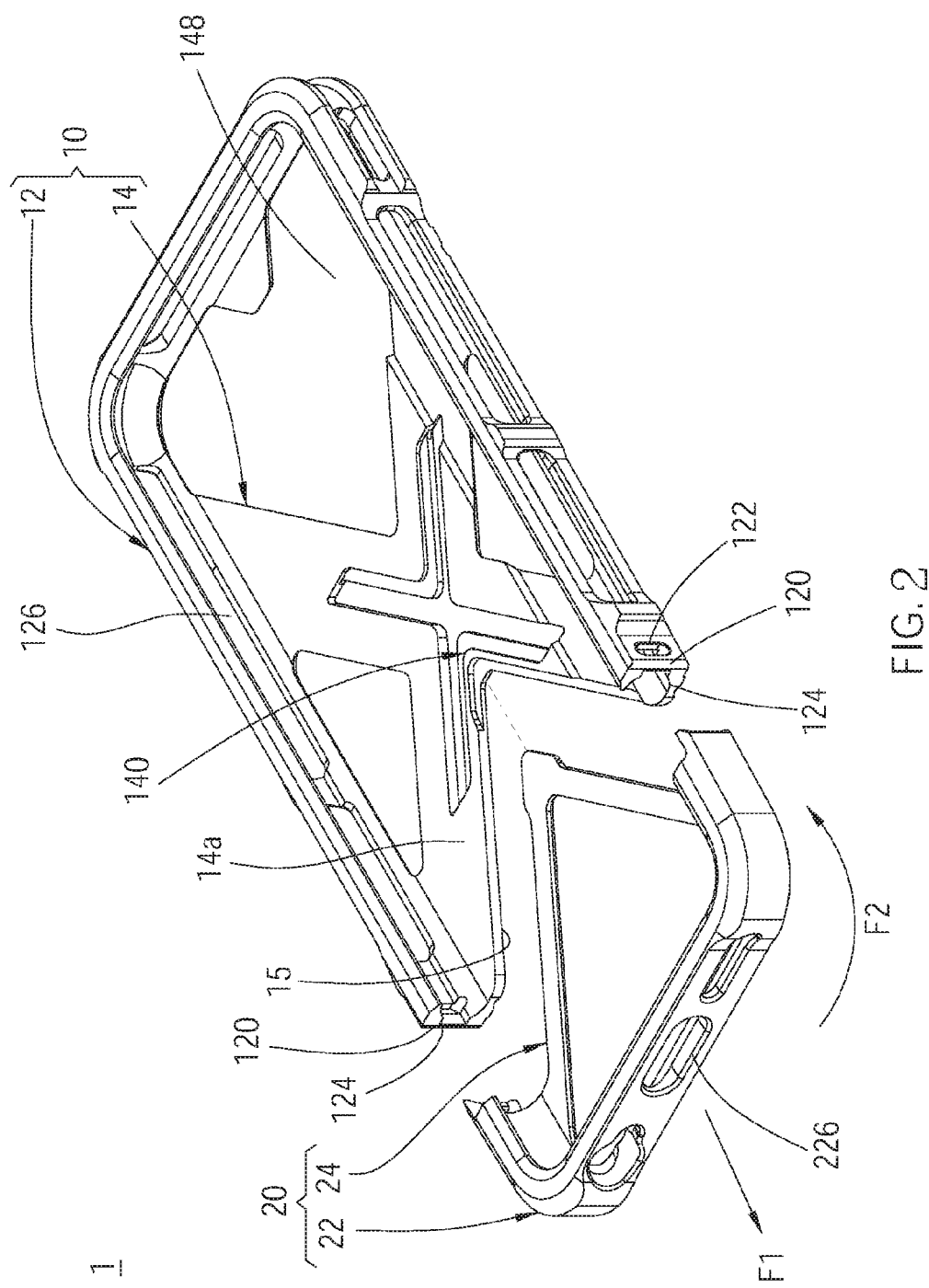
FIG. 2 is an exploded perspective view of the embodiment of the present invention.
Figure 3:
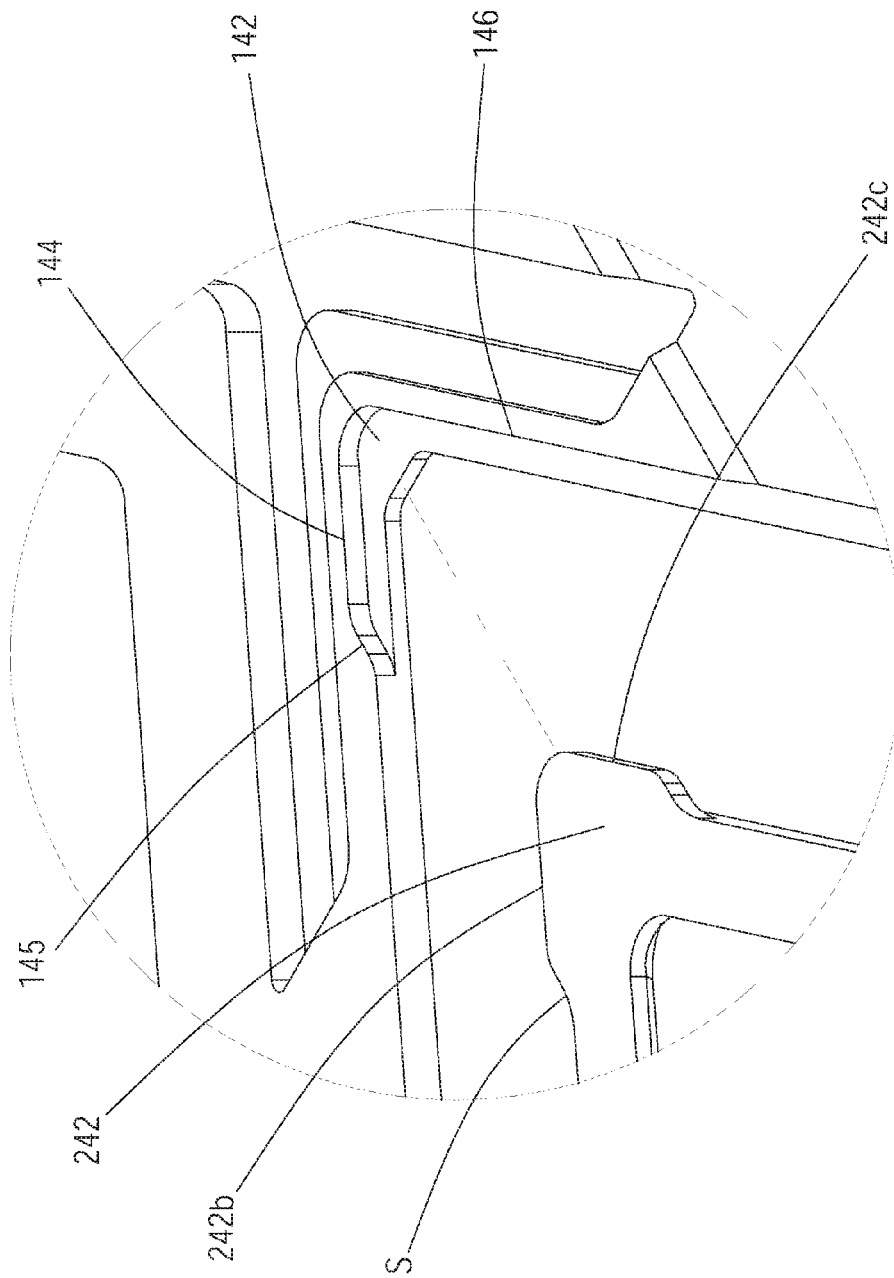
FIG. 3 is a partial enlarged view, showing the structure of the tongue plate and the notch of the embodiment of the present invention.
Figure 4:
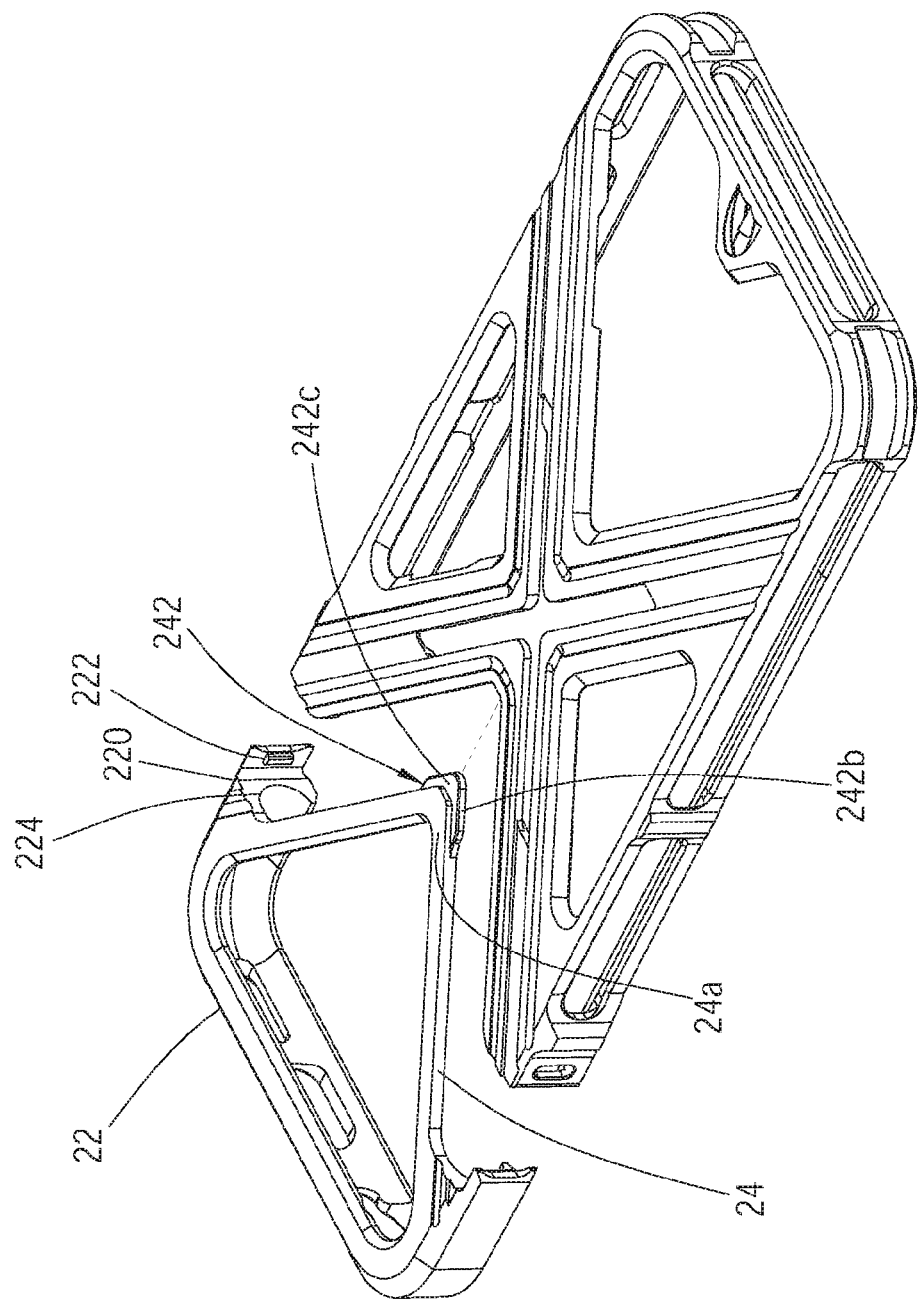
FIG. 4 is an exploded perspective view, showing the protective case of the embodiment seen from another direction.
Figure 5:
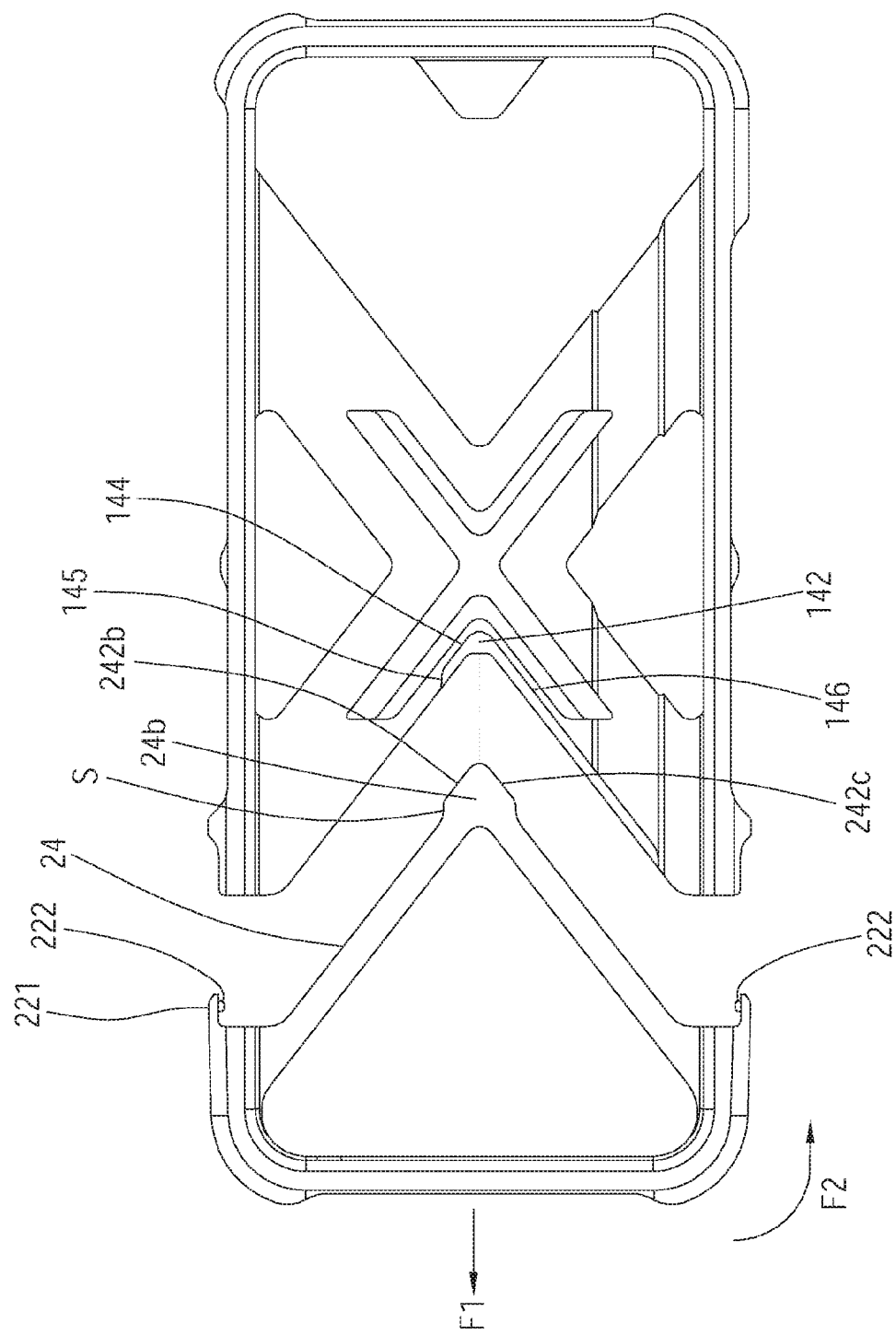
FIG. 5 is a top view of the embodiment of the present invention.

The second half frame 20 includes a second body portion 22 and a second strengthened portion 24, wherein the second half frame 20 is adapted to be connected to the first half frame 10, whereby to form a whole frame, which would surround an outer periphery of the electronic device when the protective case 1 is engaged with the electronic device. As shown in FIG. 2, FIG. 4, and FIG. 5, two second open ends 22 are respectively provided at two different positions on the second body portion 22, and each of the second open ends 220 is provided with a third abutting portion. When the first half frame 10 is connected to the second half frame 20, and the second half frame 20 is pushed by a force F1 in a first direction (as shown in FIG. 1, FIG. 2, and FIG. 5), each of the third abutting portions would respectively abut against one of the first abutting portions, preventing the second half frame 20 from being disengaged from the first half frame 10.

In the embodiment, each of the second open ends 220 respectively extends to form a lug 221, wherein each of two facing surfaces of the lugs 221 respectively has a protrusion 222 formed thereon, and a wall of each of the protrusions 222 is one of the aforementioned third abutting portions. An inner edge of the second body portion 22 is recessed to form a second slot 224, which is adapted to guide the electronic device after another side of the electronic device enters the second open ends 220, whereby to eventually fix the electronic device by engaging another part of the periphery of the electronic device within the second slot 224. In addition, a plurality of hollow portions 226 could be provided on a surface of the second slot 224 to meet different requirements as well, wherein the hollow portions 226 go through an inner side and an outer side of the second body portion 22. For instance, the hollow portions 226 could be long or round in shape, which could correspondingly expose the function keys of the electronic device for easier operation.

The second strengthened portion 24 is connected to two different positions on the second body portion 22. For instance, each of two lateral sides of the second strengthened portion 24 is connected to an inner edge on one of two lateral sides of the second body portion 22. In the embodiment, the second strengthened portion 24 and the second body portion 22 are integrally made. However, the way of making the second strengthened portion 24 and the second body portion 22 is not a limitation of the present invention. The second strengthened portion 24 has a fourth abutting portion. When the second half frame 20 is pushed by a force F2 in a second direction (as shown in FIG. 1, FIG. 2, and FIG. 5), the fourth abutting portion would abut against the second abutting portion of the first strengthened portion 14, preventing the second half frame 20 from being disengaged from the first half frame 10.

In the embodiment, an edge of the second strengthened portion 24 extends to form a tongue plate 242, wherein the tongue plate 242 has a second step surface 242a recessed into a bottom surface 24a thereof, and the second step surface 242a matches the first step surface 142. In addition, a second vertical surface 242b and a fourth vertical surface 242c are respectively provided on two sides of a periphery of the tongue plate 242, wherein the second vertical surface 242b and the fourth vertical surface 242c are respectively connected to the second step surface 242a, and the second vertical surface 242b has the aforementioned fourth abutting portion.

With the aforementioned design, when the first half frame 10 is engaged with the second half frame 20, the first open ends 120 contact with the second open ends 220, and the first abutting portion abuts against the third abutting portion. In other words, each of the protrusions 222 is respectively located in one of the perforations 122 of the first body portion 12. In this way, as shown in FIG. 2 and FIG. 5, when the second half frame 20 is pushed by the force F1 in the first direction, a wall of each of the protrusions 222 would abut against a wall of one of the perforations 122, which could prevent the first half frame 10 from being disengaged from the second half frame 20. Furthermore, when the first half frame 10 is engaged with the second half frame 20, the second abutting portion would be engaged with the fourth abutting portion, i.e., the second strengthened portion 24 would get into the notch 15, and said second step surface 242a would abut against said first step surface 142. At the same time, the second vertical surface 242b and the fourth vertical surface 242c of the tongue plate 242 would respectively abut against the first vertical surface 144 and the third vertical surface 146. As a result, when the first body portion 12 is engaged with the second body portion 22, the first slot 124 would communicate with the second slot 224, and a surrounded space is adapted to receive said electronic device.

It is worth mentioning that, when the electronic device is received in the protective case 1, the second step surface 242a is located between the electronic device and the first step surface 142, and a rear surface of the electronic device would abut and push against a top surface 24b of the tongue plate 242, wherein the top surface 24b is opposite to the bottom surface 24a. Whereby, a pressing force would be further generated to make the second step surface 242a tightly abut against the first step surface 142. Therefore, the first half frame 10 and the second half frame 20 would not be easily detached due to external impacts.

In addition, in the embodiment, a length of the second vertical surface 242b of the tongue plate 242 is substantially equal to a length of the first vertical surface 144, and a length of the fourth vertical surface 242c is less than a length of the third vertical surface 146. A bending segment S is formed on a junction of the second vertical surface 242b of the tongue plate 242 and an edge of the second strengthened portion 24. In this way, when the first half frame 10 is engaged with the second half frame 20 as shown in FIGS. 1-3 and FIG. 5, and the second half frame 20 is pushed by the force F2 in the second direction, the bending segment S of the second vertical surface 242b could effectively abut against the second segment 144b of the first vertical surface 144. In other words, the second abutting portion would abut against the fourth abutting portion, which would further ensure that the first half frame 10 and the second half frame 20 would be hard to be disassembled by an external force. Whereby, the electronic device could be protected more comprehensively and more effectively.

Furthermore, since the protrusions 222 of the third abutting portions face each other, the lugs 221 of the second half frame 20 would hold an outer edge of the first half frame 10 in an inward manner when the second half frame 20 is engaged with the first half frame 10. In addition, since the protrusions 222 are set in the perforations 122 facing each other, the protrusions 222 would not be easily detached from the perforation 122 due to external impacts. Such design could be also beneficial to the positioning and assembling between the first half frame 10 and the second half frame 20.

As shown in FIG. 6, when the first half frame 10 is about to be detached from the second half frame 20, the first half frame 10 and the second half frame 20 could respectively pivot toward two opposite directions around a pivot, wherein said pivot is a junction F between one of the first open ends and one of the second open ends on the side near the first vertical surface 144. More specifically, the third abutting portion and the first abutting portion on the other side, i.e., the side away from the first vertical surface 144, would be detached from each other first. In the embodiment, this means to pivot the second half frame 20 around the junction F clockwise (as presented by the direction of arrow A). Whereby, one of the protrusions 222 would leave the corresponding perforation 122, and therefore the second vertical surface 242b of the tongue plate 242 would be separated from the second segment 144b of the first vertical surface 144. After that, the tongue plate 242 could retreat with the fourth vertical surface 242c thereof moving in an extending direction of the third vertical surface 146, whereby to completely disengage the first half frame 10 from the second half frame 20.

It is worth mentioning that, with the aforementioned design (especially the structure of the second abutting portion and the fourth abutting portion), the second segment 144b would abut against the second vertical surface 242b when the first half frame 10 and the second half frame 20 are engaged, which would allow the first half frame 10 to be detached from the second half frame 20 only if pushed by a force in a specific direction. In this way, the first half frame 10 and the second half frame 20 would not be separated inadvertently while using the electronic device. In addition, with the bending segment S which abuts against the second segment 144b of the first vertical surface 144, a stress generated when the electronic device protected by the protective case 1 falls on a rigid surface (e.g., the ground) could be distributed evenly, so the protective case 1 would not be easily disassembled.

In summary, the protective case 1 of present invention could provide an excellent protective effect to protect the electronic device from scratches and damages. In addition, the protective case 1 has the features of high structural strength and high shock tolerance, and therefore it would not be easily disassembled by external impacts, and could provide comprehensive protection. Furthermore, the protective case 1 could be assembled and disassembled merely by hands, without needing certain hand tools. In other words, the protective case 1 would be convenient to assemble and easy to use.

It is also worth mentioning that, the second abutting portion of the present invention is located on a perpendicular bisector of the line connecting the two first open ends 120 of the first abutting portions, and the fourth abutting portion is located on a perpendicular bisector of the line connecting the two second open ends 220 of the third abutting portions, whereby to provide a better holding experience with less influence on the center of gravity of the electronic device. In other embodiments, the second abutting portion and the fourth abutting portion could be alternatively located on the left or right side of said perpendicular bisectors to meet different requirements. However, the precise locations of the second abutting portion and the fourth abutting portion are not a limitation of the present invention.

It must be pointed out that the embodiments described above are only some preferred embodiments of the present invention. Each of the aforementioned first abutting portions does not necessary to be the wall of one of the perforations, but could be a wall of a recess which is adapted to have one of the protrusions engaged therein in other embodiments. If this is the case, then the wall of each of the protrusions of the third abutting portions could abut against the wall of one of the recesses. Furthermore, in yet another embodiment, each of the first abutting portions could also be a wall of a protrusion, and each of the third abutting portions could be a surface of a recess or a wall of a perforation which are adapted to be correspondingly abutted against. The above descriptions are not the only practical ways to exercise the present invention. All equivalent structures which employ the concepts disclosed in this specification and the appended claims should fall within the scope of the present invention.

What is claimed is:

1. A protective case, which is adapted to be provided on an electronic device to reduce scratches and damages caused by impacts, wherein at least one part of the protective case surrounds an outer periphery of the electronic device; comprising:

a first half frame having a first body portion and a first strengthened portion, wherein the first strengthened portion are connected to two different positions on the first body portion; two first abutting portions are provided at two different positions on the first body portion; the first strengthened portion has a second abutting portion;

a second half frame having a second body portion and a second strengthened portion, wherein the second strengthened portion are connected to two different positions on the second body portion; the second half frame is adapted to be engaged with the first half frame, whereby to form a complete frame, which surrounds the outer periphery of the electronic device when the protective case is provided on the electronic device; two third abutting portions are provided at two different positions on the second body portion, wherein the third abutting portions abut against the first abutting portions when the first half frame is engaged with the second half frame, and when the second half frame is pushed by a force in a first direction, which prevents the second half frame from being disengaged from the first half frame; the second strengthened portion has a fourth abutting portion, wherein the fourth abutting portion abuts against the second abutting portion when the second half frame is pushed by another force in a second direction, whereby to prevent the second half frame from being disengaged from the first half frame; and wherein the first strengthened portion comprises a first vertical surface, which has the second abutting portion; the second strengthened portion comprises a second vertical surface, which has the fourth abutting portion; the second vertical surface abuts against the first vertical surface.

2. The protective case of claim 1, wherein two perforations are provided on the first half frame, and a wall of each of the perforations is one of the first abutting portions; two protrusions are provided on the second half frame, and a wall of each of the protrusions is one of the third abutting portions; when the second half frame is engaged with the first half frame, each of the protrusions respectively locates in one of the perforations.

3. The protective case of claim 1, wherein the first strengthened portion further comprises a third vertical surface and a first step surface; the third vertical surface and the first vertical surface are connected to each other, with a bend at a junction therebetween; the first step surface is connected to the first vertical surface and the third vertical surface; the second strengthened portion further comprises a fourth vertical surface and a second step surface, wherein the fourth vertical surface abuts against the third vertical surface; the second step surface is connected to the second vertical surface and the fourth vertical surface; the second step surface faces to and abuts against the first step surface.

4. The protective case of claim 3, wherein the second step surface faces away from the electronic device, and is located between the electronic device and the first step surface.

5. The protective case of claim 1, wherein the first vertical surface comprises a first segment and a second segment; the first segment and the second segment are connected to each other, with a bend at a junction therebetween; the second segment is the second abutting portion; the second vertical surface abuts against the second segment.

6. The protective case of claim 3, wherein a length of the first vertical surface is equal to a length of the second vertical surface, while a length of the third vertical surface is greater than a length of the fourth vertical surface; when the first half frame is being disengaged from the second half frame, the fourth abutting portion is retreated in an extending direction of the third vertical surface.

7. A protective case, which is adapted to be provided on an electronic device to reduce scratches and damages caused by impacts, wherein at least one part of the protective case surrounds an outer periphery of the electronic device; comprising:

a first half frame having a first body portion and a first strengthened portion, wherein the first strengthened portion are connected to two different positions on the first body portion; two first abutting portions are provided at two different positions on the first body portion; the first strengthened portion has a second abutting portion;

a second half frame having a second body portion and a second strengthened portion, wherein the second strengthened portion are connected to two different positions on the second body portion; the second half frame is adapted to be engaged with the first half frame, whereby to form a complete frame, which surrounds the outer periphery of the electronic device when the protective case is provided on the electronic device; two third abutting portions are provided at two different positions on the second body portion, wherein the third abutting portions abut against the first abutting portions when the first half frame is engaged with the second half frame, and when the second half frame is pushed by a force in a first direction, which prevents the second half frame from being disengaged from the first half frame; the second strengthened portion has a fourth abutting portion, wherein the fourth abutting portion abuts against the second abutting portion when the second half frame is pushed by another force in a second direction, whereby to prevent the second half frame from being disengaged from the first half frame; and wherein the first strengthened portion has a notch recessed into an edge thereof, and the second abutting portion is located on a periphery of the notch; the second strengthened portion is engaged with the notch, and the fourth abutting portion abuts against the second abutting portion.

8. A protective case, which is adapted to be provided on an electronic device to reduce scratches and damages caused by impacts, wherein at least one part of the protective case surrounds an outer periphery of the electronic device; comprising:

a first half frame having a first body portion and a first strengthened portion, wherein the first strengthened portion are connected to two different positions on the first body portion; two first abutting portions are provided at two different positions on the first body portion; the first strengthened portion has a second abutting portion;

a second half frame having a second body portion and a second strengthened portion, wherein the second strengthened portion are connected to two different positions on the second body portion; the second half frame is adapted to be engaged with the first half frame, whereby to form a complete frame, which surrounds the outer periphery of the electronic device when the protective case is provided on the electronic device; two third abutting portions are provided at two different positions on the second body portion, wherein the third abutting portions abut against the first abutting portions when the first half frame is engaged with the second half frame, and when the second half frame is pushed by a force in a first direction, which prevents the second half frame from being disengaged from the first half frame; the second strengthened portion has a fourth abutting portion, wherein the fourth abutting portion abuts against the second abutting portion when the second half frame is pushed by another force in a second direction, whereby to prevent the second half frame from being disengaged from the first half frame; and wherein the second abutting portion is located on a perpendicular bisector of a line connecting the two first abutting portions; the fourth abutting portion is located on a perpendicular bisector of a line connecting the two third abutting portions.

* * * * *